3,117,968
PRODUCTION OF CYANURIC ACID
Karl Merkel and Albert Palm, Ludwigshafen (Rhine), Germany, assignors to Badische Anilin- & Soda-Fabrik Aktiengesellschaft, Ludwigshafen (Rhine), Germany
No Drawing. Filed Jan. 2, 1962, Ser. No. 163,859
Claims priority, application Germany Oct. 28, 1958
2 Claims. (Cl. 260—248)

The present invention relates to an improved process for the separation of cyanuric acid from the reaction mixture used in the conventional-type method of producing cyanuric acid by heating urea in a liquid.

In the technical-scale production of cyanuric acid by conventional methods the cyanuric acid formed separates from the liquid as a solid. Part of this solid settles down in crystalline form on the inner side of the reactor wall whence it can be removed only with difficulty in a mechanical way.

The object of this invention is a method of producing cyanuric acid in which no deposits of cyanuric acid on the inner wall of the reactor occur and in which the necessity of removing such deposits mechanically does not therefore exist.

A further object is the production of cyanuric acid having a high degree of purity.

These objects are achieved by the method according to this invention by which the reaction mixture containing cyanuric acid and an auxiliary liquid is treated with a solution of a substance selected from the group consisting of potassium hydroxide, sodium hydroxide, potassium acetate, potassium carbonate, potassium formate, sodium acetate, sodium carbonate and sodium formate in a solvent selected from the group consisting of water and a mixture of water with an alcohol, e.g. methanol, ethanol or isopropanol. By this treatment a cyanurate solution is formed. This is separated from the auxiliary liquid which again is recycled to the reactor. It is preferable to use an aqueous alkali hydroxide solution containing less than 25% by weight of alkali hydroxide. This prevents the cyanurate solution from becoming so concentrated that upon cooling the pipes and vessels are clogged by deposits of alkali cyanurate.

In the practice of our invention cyanuric acid is made in conventional manner by heating urea in diphenyl oxide, diphenyl or a mixture of diphenyl oxide and diphenyl to a temperature at which cyanuric acid is formed from urea. The relative proportions of the two components when a mixture of diphenyl oxide and diphenyl is used, may vary within wide limits ranging from 1 to 99% (by weight) for either component. The temperature is above 200° C., preferably between 220° and 270° C. As disclosed in our U.S. Patent No. 3,051,708, issued August 28, 1962, and in our German Patent No. 1,064,522, granted September 3, 1959, the temperature should be not greater than 300° C. because, above this temperature, by-products are formed which contaminate the cyanuric acid too greatly.

It is not necessary to convert the cyanuric acid completely into the alkali salt thereof, i.e., all hydroxy groups of the cyanuric acid need not be reacted with the above-mentioned alkaline media. However it is advantageous to use the alkali hydroxide or the alkali salt of a weak acid, such as potassium or sodium acetate, carbonate or formate, in such an amount that the cyanuric acid is substantially converted to the trialkali cyanurate because the trialkali cyanurates have a good solubility in water and mixtures of water and alcohol.

When the solvent used is a mixture of water and alcohol, the amount of alcohol contained therein should only be such as ensure that the alkali compounds are dissolved well. The cyanurate formed by the reaction with cyanuric acid must also dissolve well in the mixture. The aqueous cyanurate solution can be further processed without special purification, for example for the production of tri- or di-chlorcyanuric acid. However the free cyanuric acid may also be obtained by acidifying the solution, for example with mineral acids.

Compared with the conventional methods, the production of cyanuric acid by the method according to this invention is greatly simplified. Moreover the purity of the cyanuric acid obtained is improved. The content of the pure substance in the end product is 98% by weight or more.

The process may be carried out continuously or batchwise. The formation of the cyanurate may be effected at normal or increased pressure and temperature.

The following examples will further illustrate this invention but the invention is not restricted to these examples. The parts and percentages specified in the examples are parts by weight.

*Example 1*

1,000 parts of diphenyl oxide is placed in a 3-m.$^3$ stainless steel reactor and then 780 parts of urea is added evenly through a metering device during the course of 2 hours. The temperature of the reaction mixture is kept at 245° to 258° C. During reaction 190 parts of ammonia and 35 parts of ammonium salts, mainly ammonium carbonate escape. After the reaction has ended, the reactor and its contents are cooled to 100° C. and the reactor is connected by a pipe to an 8-m.$^3$ vessel containing 5,310 parts of an 8.8% aqueous caustic soda solution. The reactor and the vessel are interconnected by a circulating pump so that a closed circulatory system is established. The caustic soda solution is recirculated for about an hour, the whole of the cyanuric acid passing into solution. The aqueous cyanurate solution and the diphenyl oxide are then allowed to flow into a reservoir and the organic phase is separated from the aqueous phase. The diphenyl oxide is returned to the reactor while the aqueous cyanurate solution is pumped through a carbon filter and then adjusted to pH 3 to 4 in a stirring vessel by the addition of hydrochloric acid. The cyanuric acid which deposits out is separated from the liquid, washed with water and dried. There are obtained 500 parts of colorless cyanuric acid with a purity of about 99%. The yield is 90% of the theory.

*Example 2*

780 parts of urea is heated in 1,000 parts of diphenyl oxide to about 245° to 258° C. in the manner described in Example 1. When the formation of the cyanuric acid has ended, 6,450 parts of a 12.5% aqueous solution of sodium acetate is recirculated at a temperature of 60° to 70° C. for about an hour. By processing the sodium cyanurate solution as described in Example 1 there is obtained 506 parts of colorless cyanuric acid having a purity of about 99%.

*Example 3*

1,000 parts of diphenyl is placed in a stainless steel reactor and to this liquid 780 parts of urea is added evenly over a period of two and one half hours, the pressure being maintained at 370 mm. Hg during the urea addition. The temperature of the reaction mixture is 220° to 225° C. During reaction there are formed 182 parts of ammonia and 41 parts of ammonium salts, mainly ammonium carbonate, which escape from the reaction mixture in gaseous form. When all of the urea has been added, the reaction mixture is stirred for another 20 minutes and then cooled to about 60° C. The cyanuric acid formed during reaction is available in the reactor as a solid. Then 5,320 parts of a 8.7% sodium hydroxide solution are run into the reaction mixture from a reservoir and the mixture of diphenyl and aqueous sodium hydroxide solution is recirculated, the cyanuric acid passing into solution as the sodium salt. From this solution, by stripping the aqueous solution from diphenyl and acidification to pH 3, cyanuric acid is obtained which precipitates from the solution. It is separated from the aqueous solution, washed with little water and dried at a vacuum of 20 mm. Hg and a temperature of 90° C. There is obtained 514 parts by weight of a white powder of which 99.7% is cyanuric acid.

*Example 4*

1,000 parts of a mixture of 80% of diphenyl and 20% of diphenyl oxide is placed in a stainless steel reactor and to this mixture 760 parts of urea is added evenly over a period of one and three quarters of an hour, the temperature of the reaction mixture being maintained at 265° to 270° C. during reaction. The reaction mixture is under an excess pressure of 0.5 atmosphere. When all of the urea has been added, the reaction mixture is stirred for 10 minutes. The reaction mixture is added with 5,320 parts of an 8.7% aqueous sodium hydroxide solution and then recirculated as in Example 1. After stripping the organic liquid, precipitating the cyanuric acid from the aqueous solution and drying it, there is obtained 503 parts of a white powder of which 99.6% is cyanuric acid.

*Analysis.*—Found: C=27.6%; H=2.6%; O=37.0%; N=32.9%. Calculated: C=27.9%; H=2.4%; O=37.2%; N=32.6%.

This application is a continuation-in-part of our copending application Serial No. 842,198 of September 25, 1959, now abandoned.

What we claim is:

1. In a process for the production of cyanuric acid by heating urea to a temperature above 200° C. and up to 300° C. in the presence of a substance selected from the group consisting of diphenyl oxide, diphenyl and a mixture of diphenyl oxide and diphenyl, the improvement which comprises treating the reaction mixture containing cyanuric acid with a solution of an alkali compound selected from the group consisting of potassium hydroxide, sodium hydroxide, potassium acetate, potassium carbonate, potassium formate, sodium acetate, sodium carbonate, and sodium formate in a solvent selected from the group consisting of water and a mixture of water and alcohol and separating from the auxiliary liquid an aqueous solution of the alkali cyanurate formed by the reaction of the cyanuric acid and the alkali compound.

2. A process as claimed in claim 1, wherein an aqueous solution is used which contains less than 25% by weight of alkali hydroxide.

References Cited in the file of this patent

UNITED STATES PATENTS

| | | |
|---|---|---|
| 2,872,447 | Oehlschlaeger | Feb. 3, 1959 |
| 3,051,708 | Merkel et al. | Aug. 28, 1962 |

FOREIGN PATENTS

| | | |
|---|---|---|
| 551,749 | Canada | Jan. 14, 1958 |